US006948308B2

(12) United States Patent
Chandler et al.

(10) Patent No.: US 6,948,308 B2
(45) Date of Patent: Sep. 27, 2005

(54) COMBATTING AIR POLLUTION

(75) Inventors: Guy Richard Chandler, Little Eversden (GB); Alan Francis Diwell, Sonning Common (GB); Raj Rao Rajaram, Slough (GB)

(73) Assignee: Johnson Matthey Public Limited Company, London (GB)

( * ) Notice: Subject to any disclaimer, the term of this patent is extended or adjusted under 35 U.S.C. 154(b) by 164 days.

(21) Appl. No.: 10/369,364

(22) Filed: Feb. 18, 2003

(65) Prior Publication Data

US 2003/0226352 A1 Dec. 11, 2003

Related U.S. Application Data

(63) Continuation of application No. 09/600,605, filed as application No. PCT/GB99/00090 on Jan. 12, 1999, now Pat. No. 6,546,717.

(30) Foreign Application Priority Data

Jan. 19, 1998 (GB) .............................. 9801023

(51) Int. Cl.$^7$ ................................. F01N 3/00
(52) U.S. Cl. .............................. 60/274; 60/289; 60/300; 60/301; 423/213.2; 423/239.1; 423/244.09; 423/244.01
(58) Field of Search .................. 60/274, 289, 293, 60/299, 300, 301; 423/213.2, 213.7, 215.5, 239.1, 239.2, 244.01

(56) References Cited

U.S. PATENT DOCUMENTS

| 4,011,298 A | | 3/1977 | Fukui et al. | |
|---|---|---|---|---|
| 4,999,998 A | * | 3/1991 | Akerib | .................... 60/274 |
| 5,711,147 A | | 1/1998 | Vogtlin et al. | |
| 5,806,305 A | | 9/1998 | Miller et al. | |
| 5,807,526 A | | 9/1998 | Miljevic | |
| 5,853,684 A | | 12/1998 | Fang et al. | |
| 5,863,413 A | | 1/1999 | Caren et al. | |
| 6,003,303 A | | 12/1999 | Peter-Hoblyn et al. | |
| 6,030,506 A | | 2/2000 | Bittenson et al. | |
| 6,038,854 A | | 3/2000 | Penetrante et al. | |
| 6,047,543 A | | 4/2000 | Caren et al. | |
| 6,066,590 A | | 5/2000 | Horii et al. | |
| 6,162,409 A | | 12/2000 | Skelley et al. | |
| 6,185,930 B1 | * | 2/2001 | Lepperhoff et al. | ........... 60/274 |
| 6,212,883 B1 | * | 4/2001 | Kang | ........................... 60/275 |
| 6,345,497 B1 | * | 2/2002 | Penetrante | .................... 60/275 |
| 6,546,717 B1 | * | 4/2003 | Chandler et al. | ............. 60/274 |
| 6,557,340 B1 | * | 5/2003 | Twigg et al. | .................. 60/275 |

FOREIGN PATENT DOCUMENTS

| DE | 2 615 456 | 10/1977 |
|---|---|---|
| EP | 0 199 037 | 10/1986 |
| EP | 0 341 832 | 11/1989 |
| EP | 0 560 991 | 9/1993 |
| EP | 0 716 875 | 6/1996 |
| EP | 0 758 713 | 2/1997 |
| JP | 51003365 | 1/1976 |
| JP | 5192535 | 8/1993 |
| JP | 05 212244 | 8/1993 |
| JP | 08/281061 | 10/1996 |
| WO | WO 97/22794 | 6/1997 |

OTHER PUBLICATIONS

International Search Report for corresponding application PCT/GB99/00090, search date, Apr. 23, 1999.
British Search Report for corresponding application GB 9801023.4, search date Apr. 15 1998.
G. P. Ansell et al. "Mechanism of the lean NO$_x$ reaction over Cu/ZSM–5", *Applied Catalysis B: Environmental*, 2 (1993) pp: 81–100.
J. Eng et al.; "Kinetic and Mechanistic Study of NO$_x$ Reduction by NH$_3$ over H–Form Zeolites", *Journal of Catalysis*, No. 171, 1997, pp. 27–44 (XP–002100967).

* cited by examiner

*Primary Examiner*—Binh Q. Tran
(74) *Attorney, Agent, or Firm*—RatnerPrestia

(57) ABSTRACT

In the control of pollutants such as NO$_x$ in the exhaust gases from internal combustion engines, ozone is reacted with NO to form NO$_2$, which is then reduced catalytically to N$_2$.

21 Claims, 11 Drawing Sheets

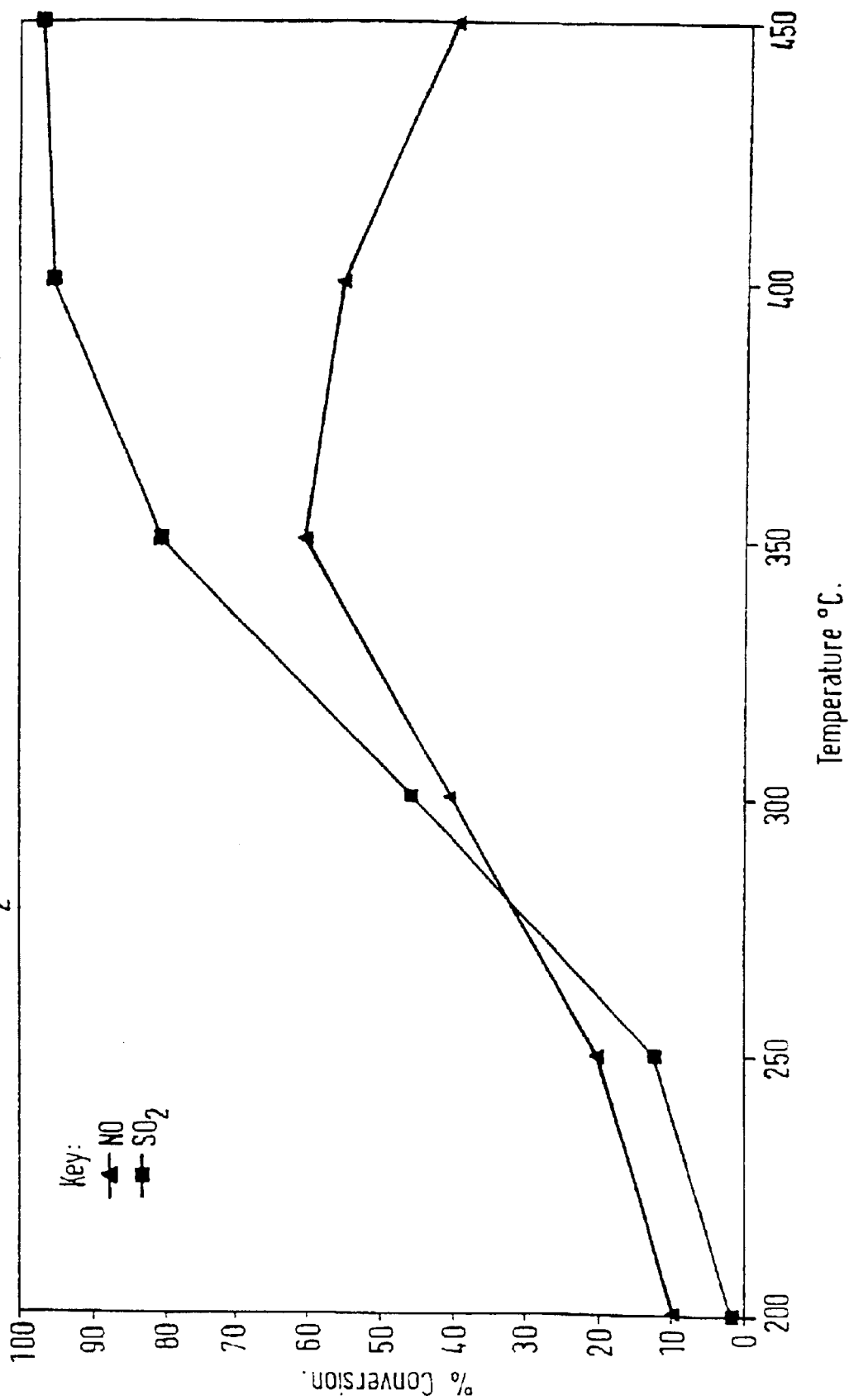
Fig. 1. NO and SO₂ Oxidation Activities.

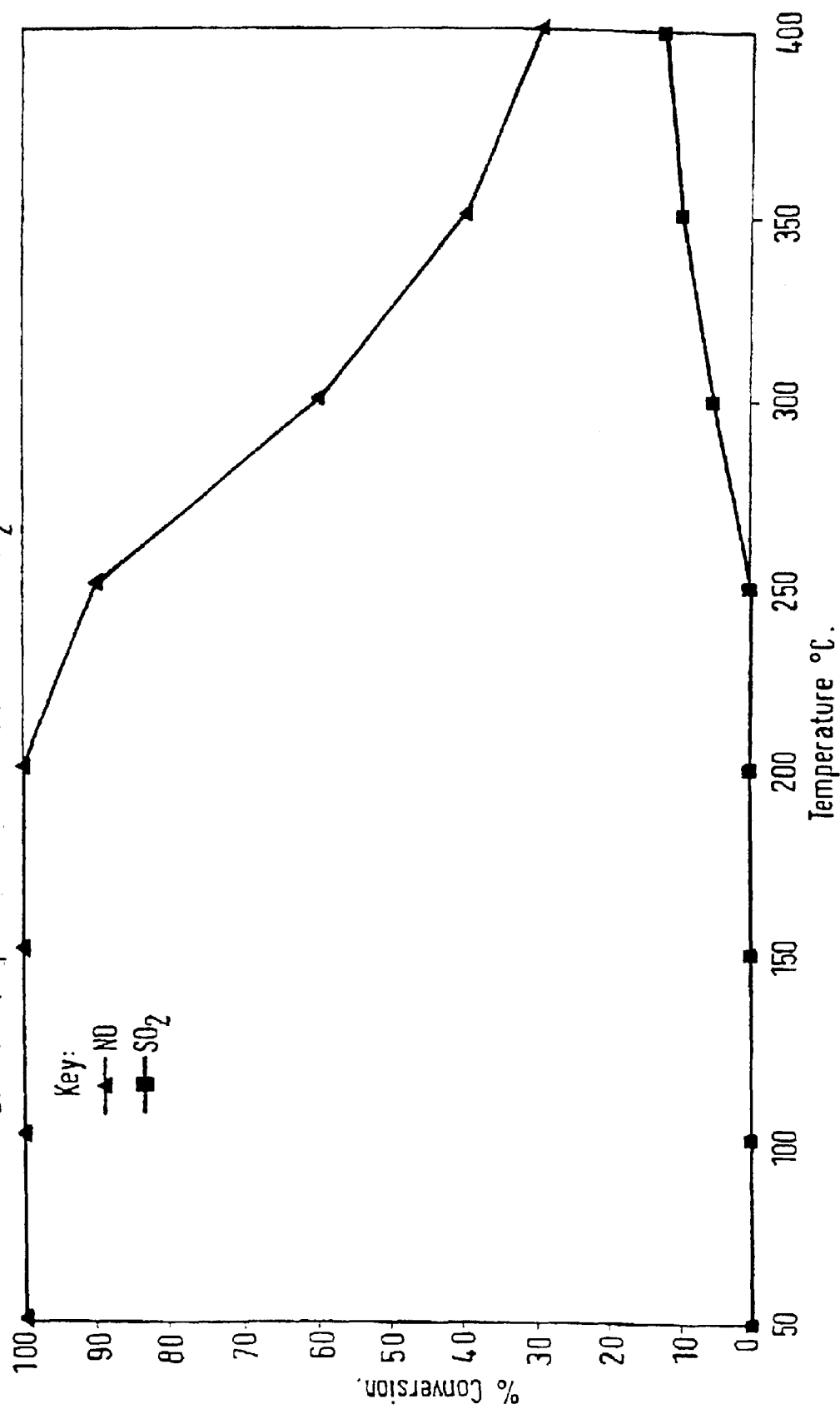
Fig. 2. Effect of Temperature on Ozone-NO and Ozone-$SO_2$ oxidation.

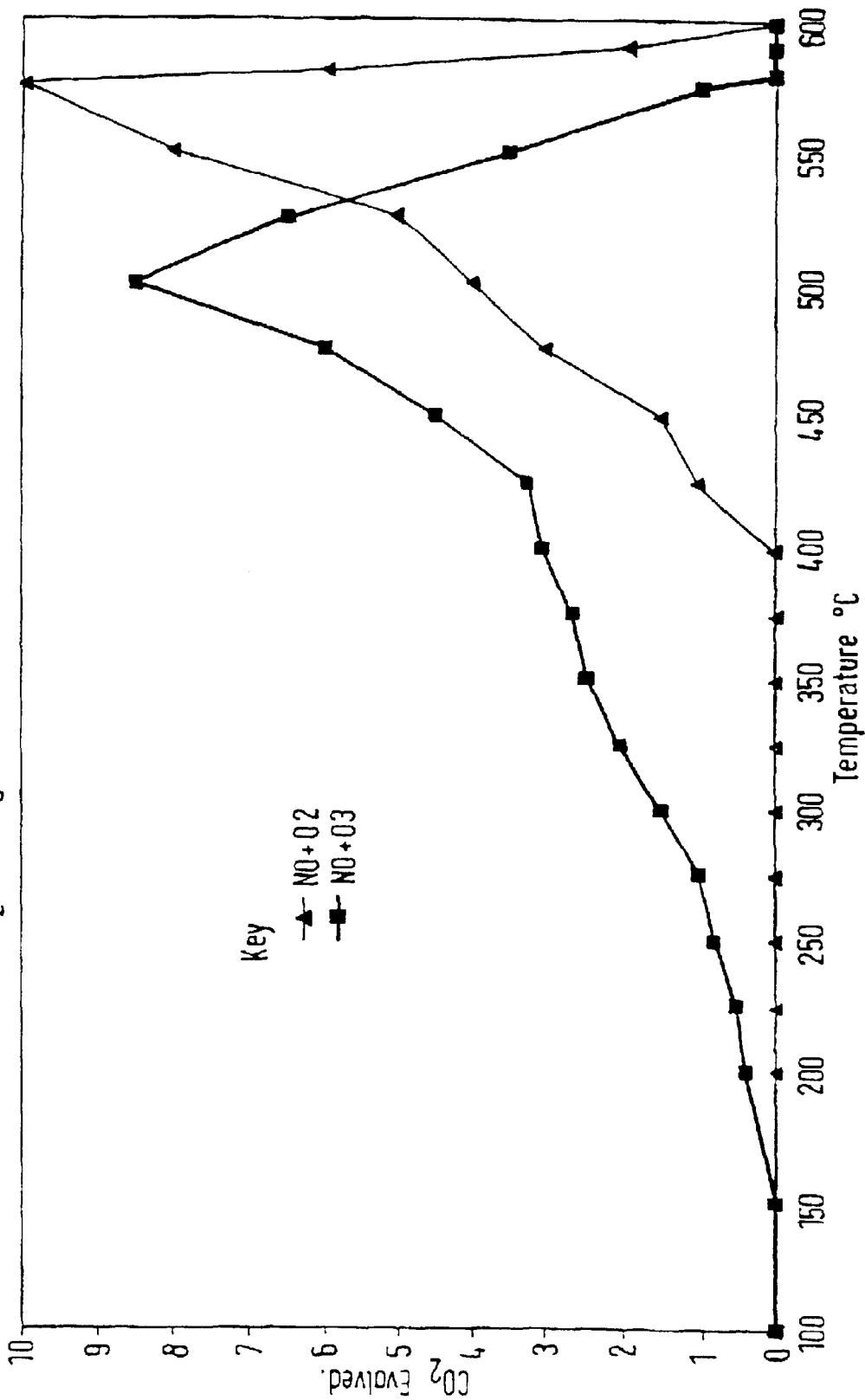
Fig. 3. Effect of NO-O$_2$ or NO-O$_3$ on the oxidation of soot.

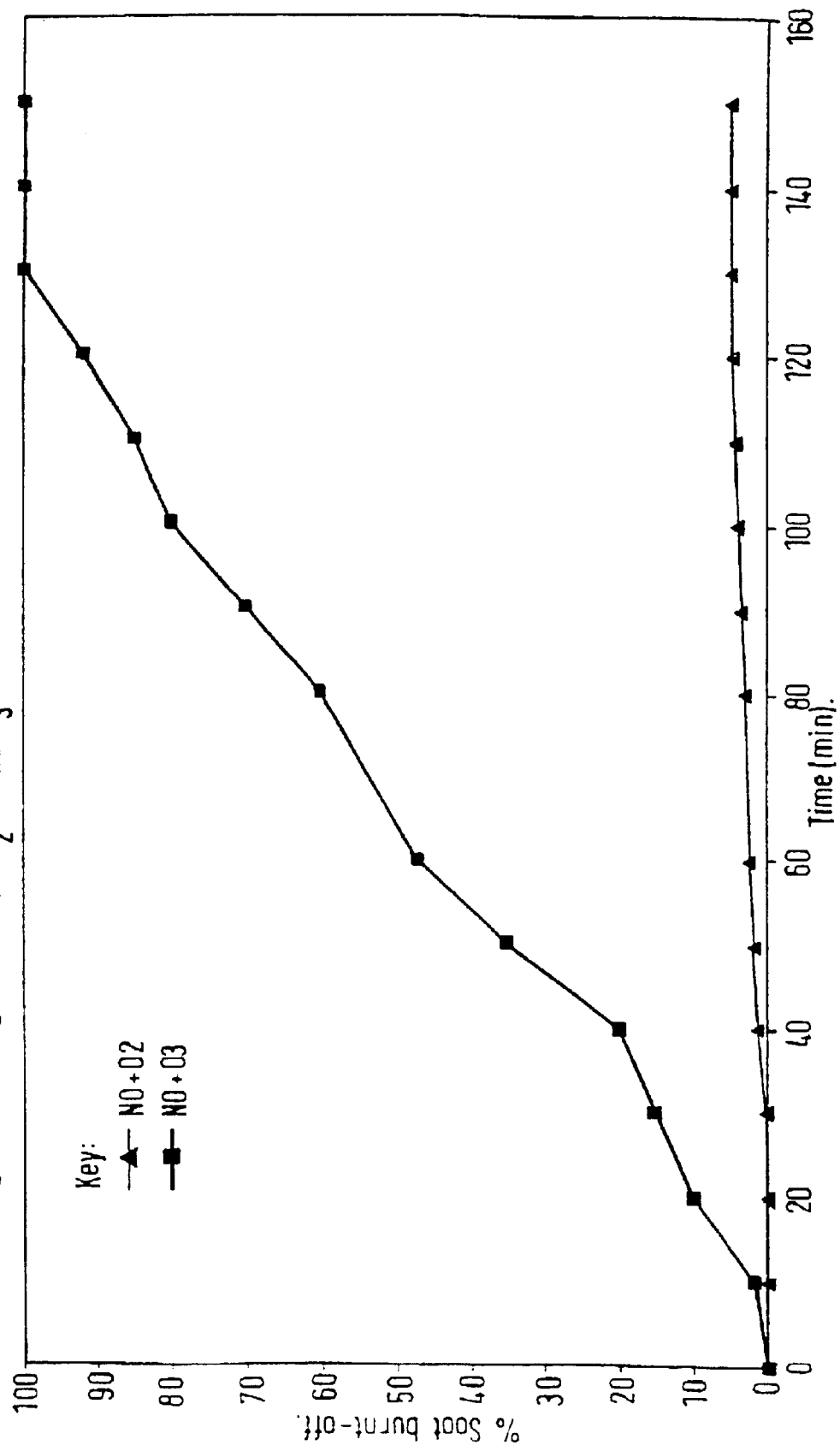
Fig. 4. Effect of NO-O₂ and NO-O₃ on Soot Oxidation at 300°C.

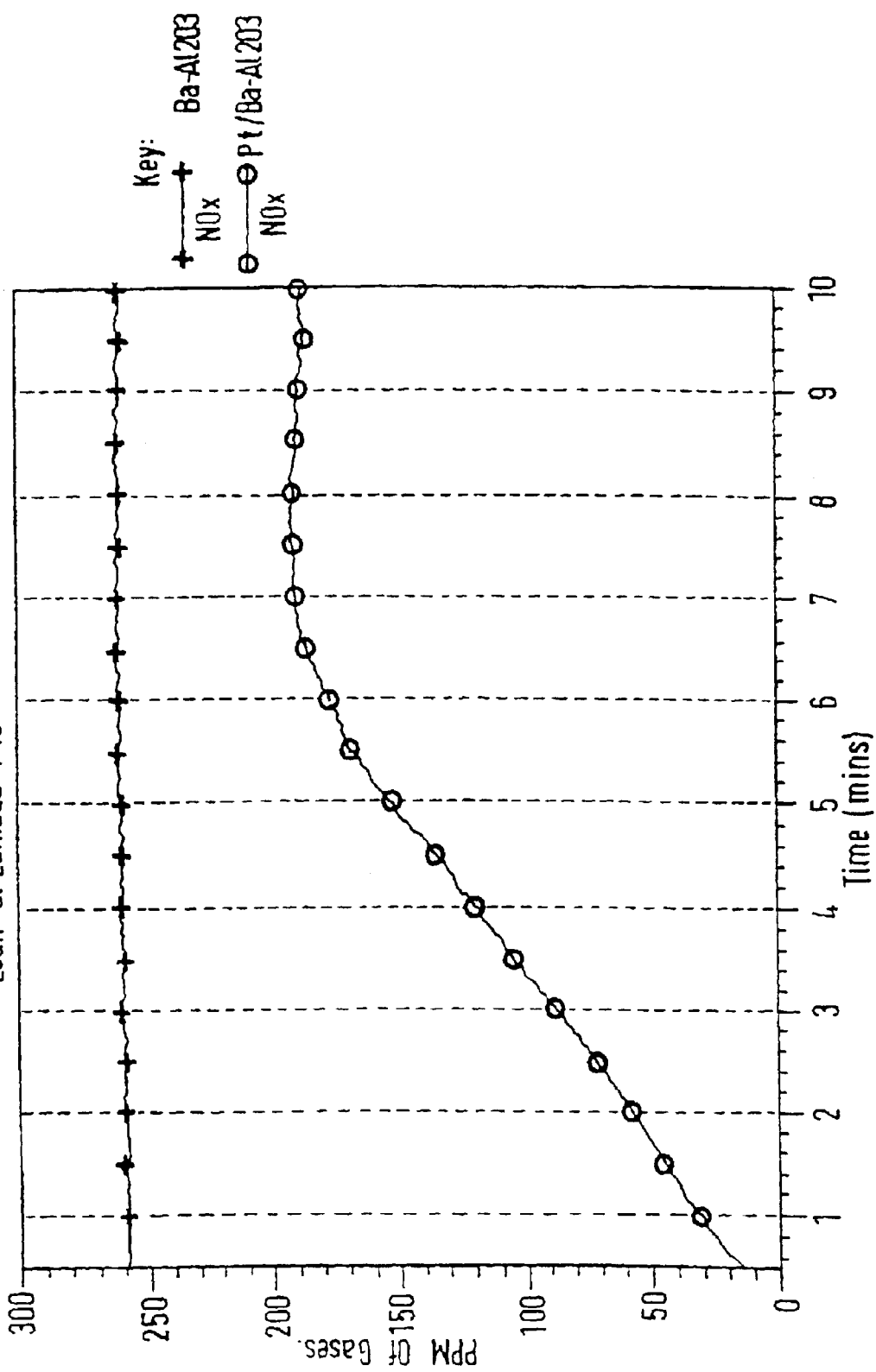

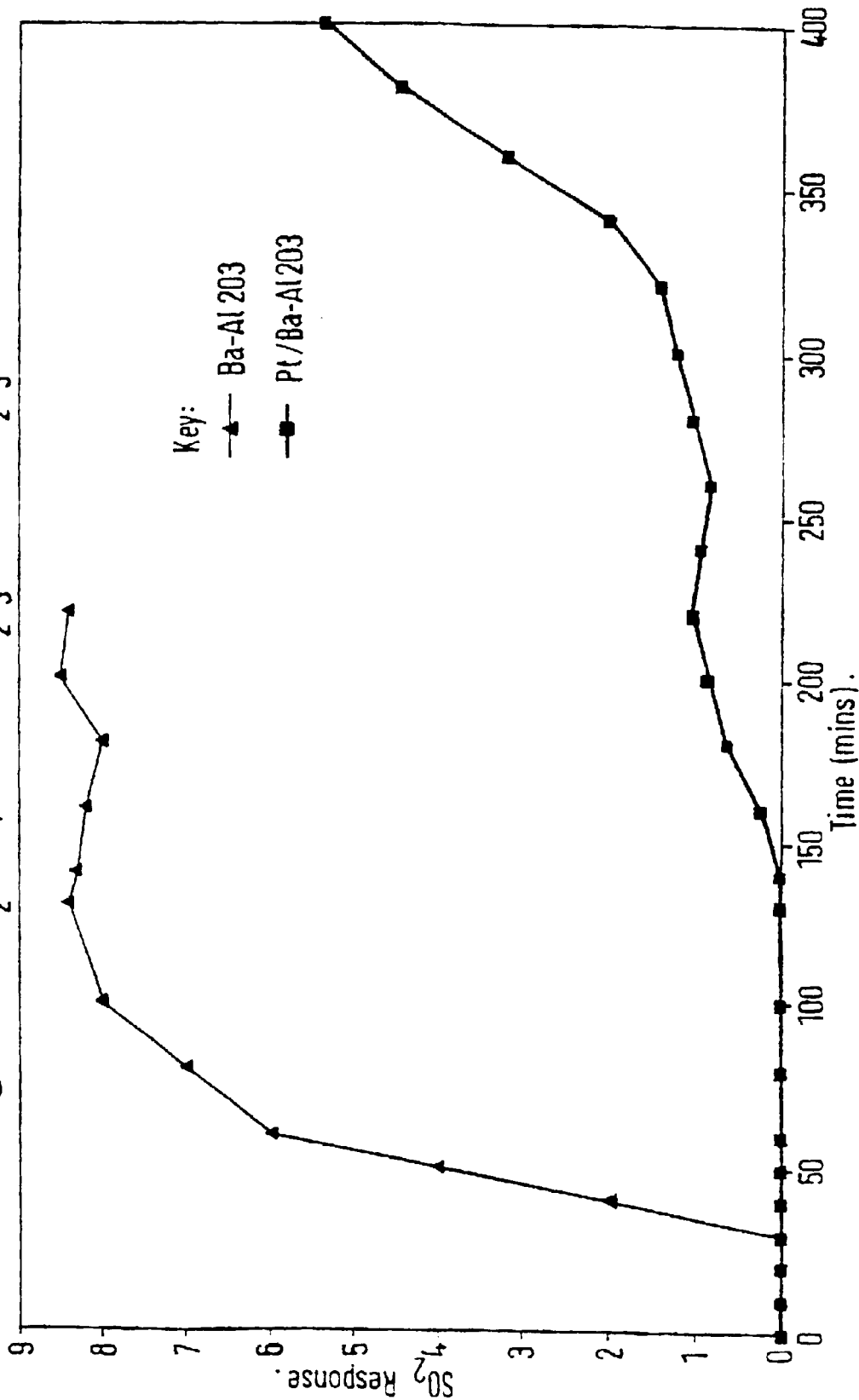
Fig. 6. SO₂ Absorption on Ba-Al₂O₃ and Pt/Ba-Al₂O₃ at 650°C.

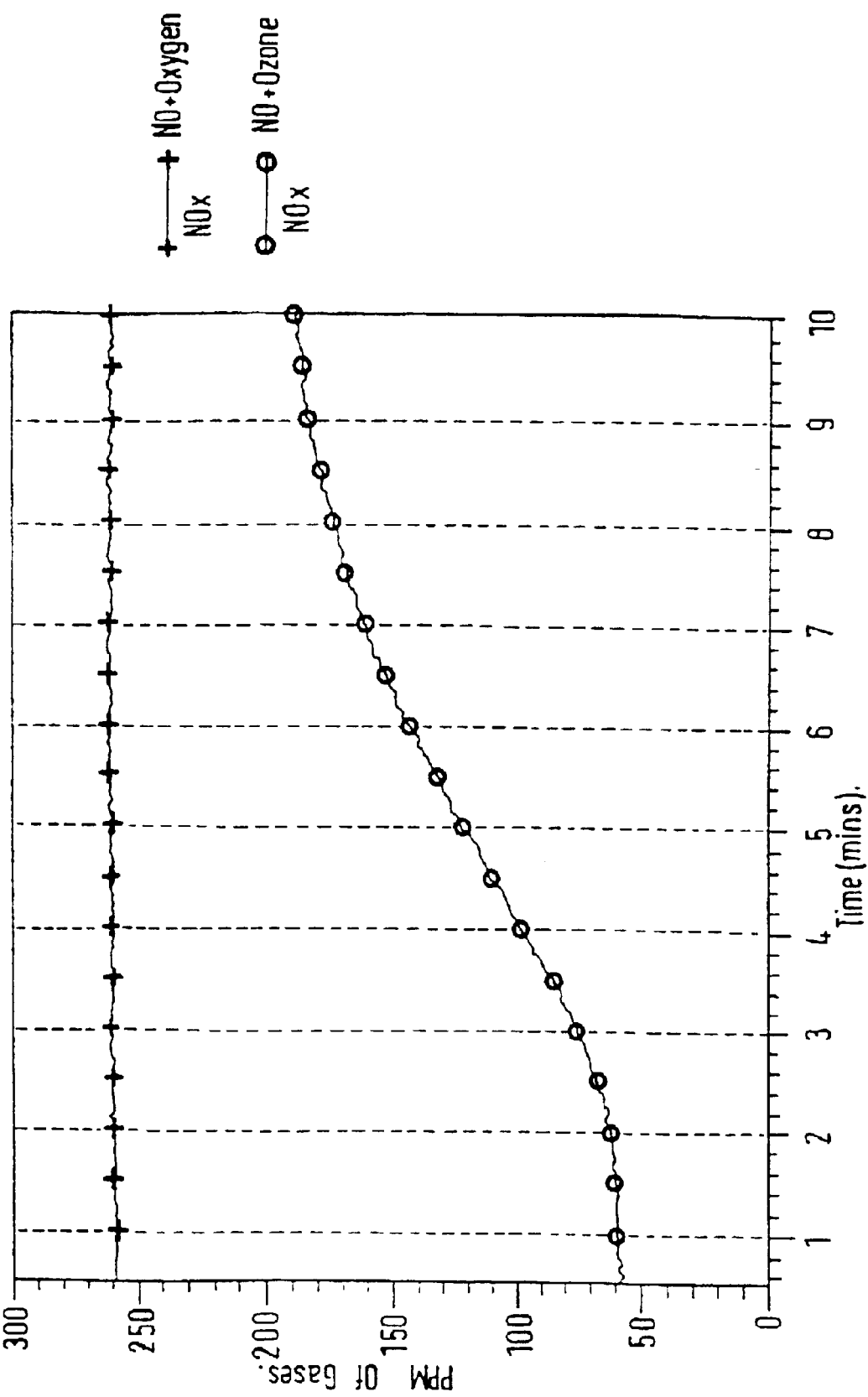

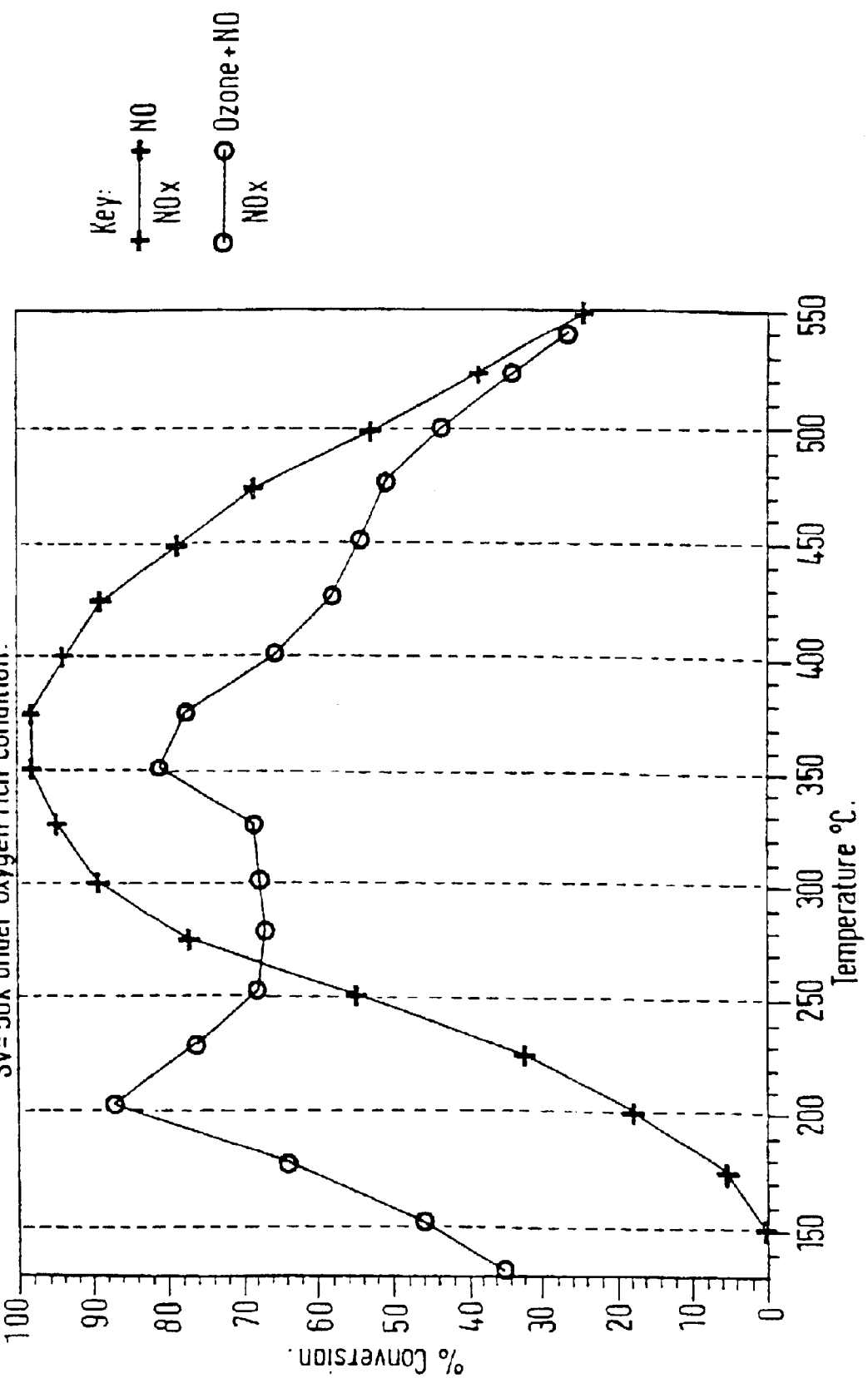

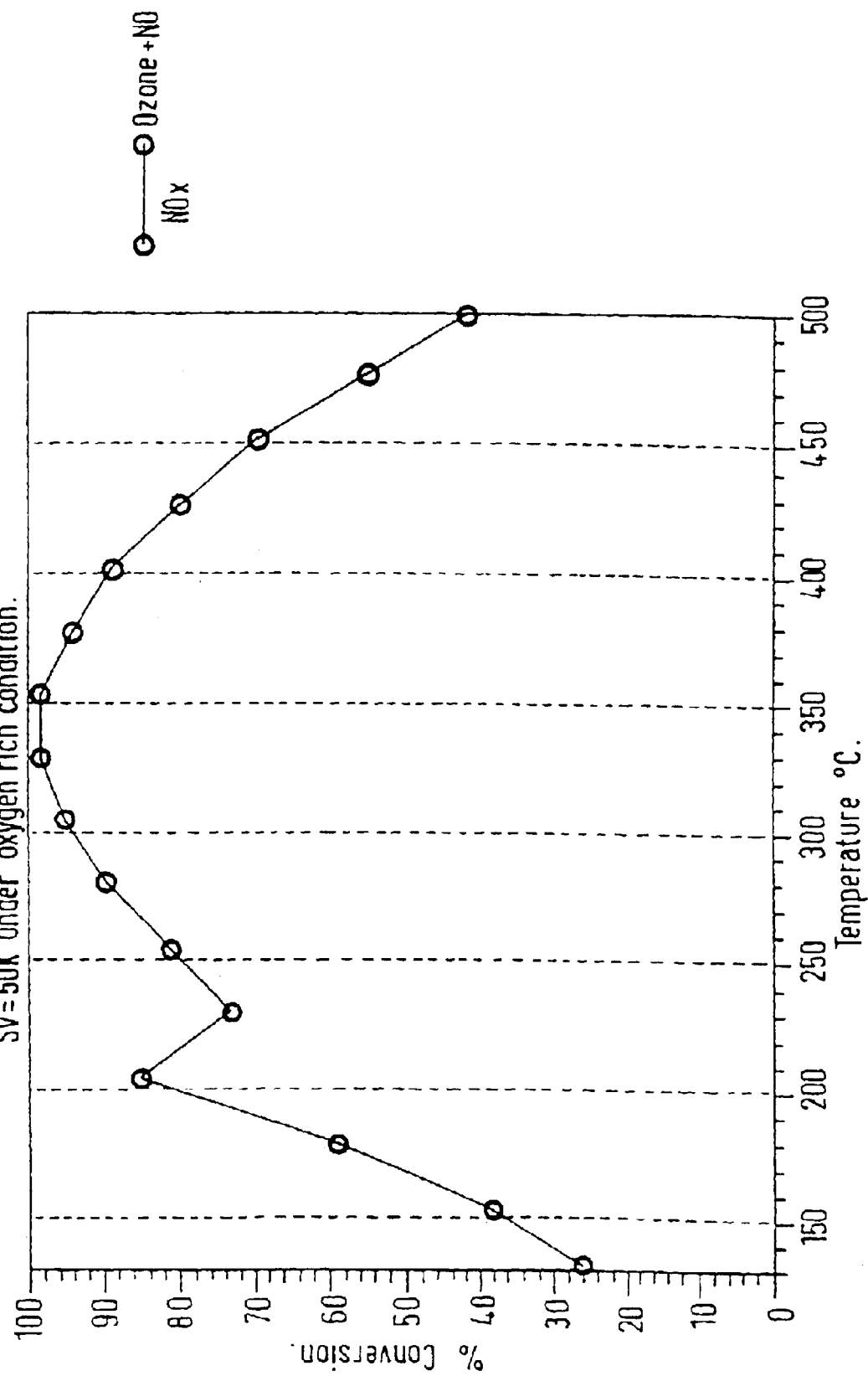
Fig. 9. Effect of controlled Ozone addition on NOx activity (NH3-SCR) of Cu/ZSM5. SV=50K under oxygen rich condition.

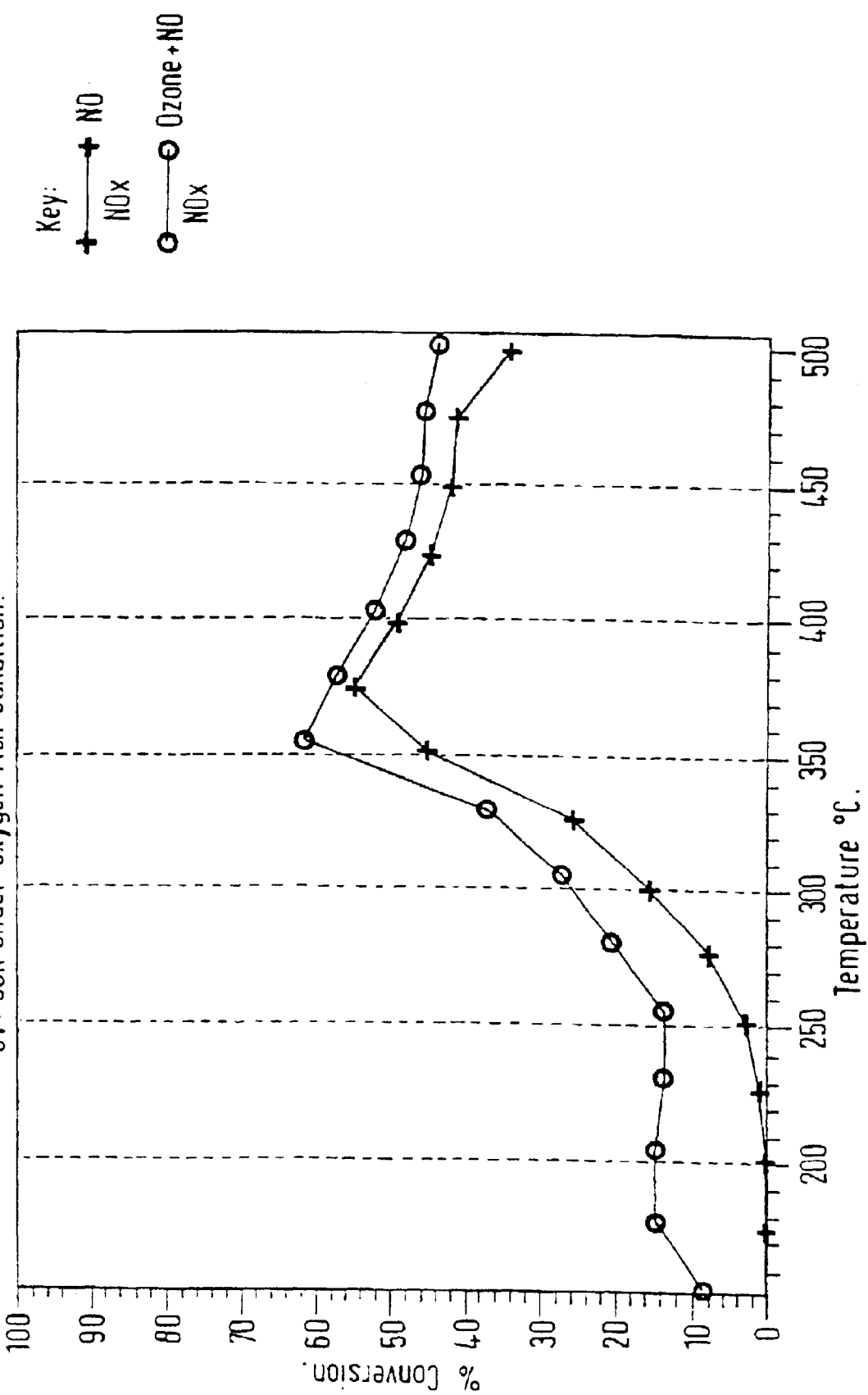
Fig. 10. Effect of Ozone addition on NOx activity (C3H6-SCR) of Cu/ZSM5. SV=50K under oxygen rich condition.

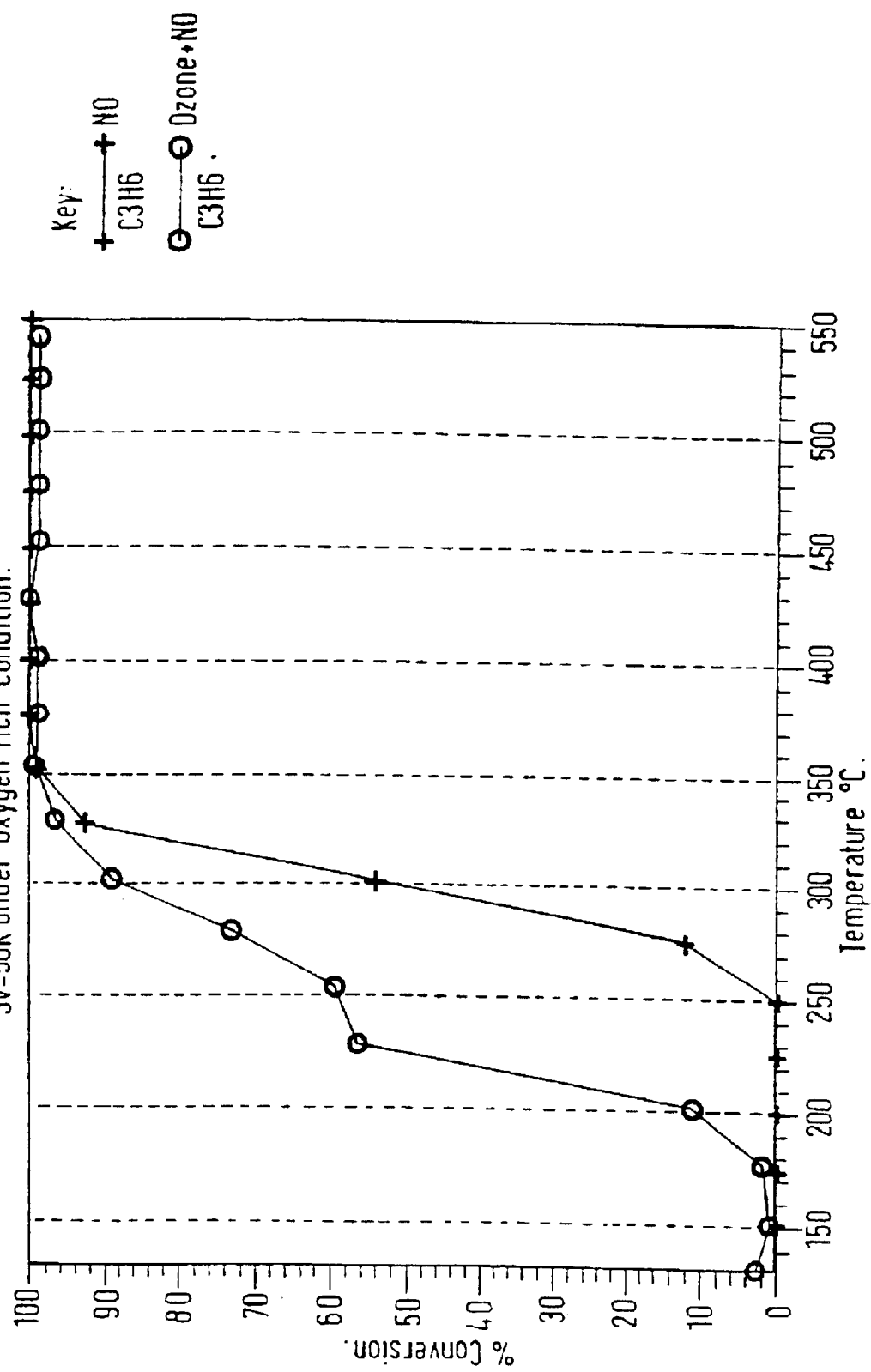

COMBATTING AIR POLLUTION

CROSS-REFERENCE TO RELATED APPLICATIONS

This application is a continuation of U.S. patent application Ser. No. 09/600,605, filed Oct. 2, 2000 now U.S. Pat. No. 6,546,717, which is the U.S. national phase application of PCT International Application No. PCT/GB99/00090 filed on Jan. 12, 1999.

This invention relates to a method of combatting air pollution from the exhaust gas of an internal combustion engine, and to an internal combustion engine whose exhaust apparatus contains means therefor.

One of the pollutants in the exhaust gas of an internal combustion engine is NOx (oxides of nitrogen). NOx is produced by the thermal fixation of nitrogen in the combustion air, leading to thermal NOx, or by the conversion of chemically bound nitrogen in the fuel, leading to fuel NOx. The most abundant nitrogen species in an engine exhaust stream is NO, with low amounts of $NO_2$ and $N_2O$. For example, the nitrogen oxide species in the exhaust stream of a typical diesel passenger car are about 95% NO, 4% $NO_2$ and a little $N_2O$.

Although nitrogen monoxide (NO) is the most abundant nitrogen species in an engine exhaust stream, various processes for the treatment of the exhaust gas proceed more rapidly when the NOx species is $NO_2$ rather than NO. For example, European patent specification 341832A discloses that in the regeneration of a diesel particulate trap at low temperature, $NO_2$ is a more effective oxidant than NO or $O_2$. Again, to combat NOx emissions from lean-burn engines, it has been proposed to adsorb NOx by an adsorbent when the exhaust gas is lean (ie when there is a stoichiometric excess of oxygen) and release the adsorbed $NO_2$ when the exhaust gas is rich, the exhaust gas being periodically made rich to release the adsorbed NOx; during the lean operation. NO is oxidised to $NO_2$ which can then readily react with adsorbent surface to form nitrate—see for instance European patent specification 560991A. Yet again, in other strategies to combat NOx emissions from lean-burn engines, such as selective catalytic reduction (SCR), there are indications that the presence of $NO_2$ may be beneficial, see for instance Applied Catalysis B: Environmental, 2 (1993) 81–100, Elsevier Science Publishers BV and Journal of Catalysis 171, 27–44 (1997), Academic Press.

It would be desirable to be able to oxidise NO to $NO_2$ in engine exhaust gas at a lower temperature, for instance because the engine is operating at a lower temperature or while the exhaust apparatus is warming up after the engine has been started at ambient temperature.

In addition, it would be desirable to oxidise NO to $NO_2$ in engine exhaust gas while not oxidising $SO_2$ to $SO_3$. Fuels such as petrol (gasoline) or diesel contain small quantities of organo-sulphur compounds, eg thiophene. In the engine operation, these compounds are oxidised to $SO_2$. If the $SO_2$ is oxidised to $SO_3$, the $SO_3$ can readily react to form sulphuric acid or sulphate, which is undesirable. For instance, in diesel engines a small fraction of the $SO_2$, typically about 2%, is further oxidised to $SO_3$, which condenses with water in the exhaust gas as sulphuric acid, which is then adsorbed on carbonaceous particulates, hence increasing the mass of particulates. Increasing the amount of $SO_3$ is thus undesirable. Again, in the technique of NOx adsorption discussed above, $SO_3$ readily adsorbs on the NOx adsorbent to form base metal sulphate, which, since metal sulphates are generally much more stable than nitrates, deactivates the adsorbent and requires high temperature regeneration of it. Yet again, in the SCR technique discussed above, $SO_3$ can react with reductant ammonia to form ammonium sulphate, which can poison the catalyst.

Catalysts which are active in the oxidation of NO to $NO_2$ are also very active in the oxidation of $SO_2$ to $S_3$. The most effective, and most commonly used, catalyst for oxidising NO to $NO_2$ is based on Pt see for instance European specifications 560991A and 341832A cited above. Pt, however, is very active in the oxidation of $SO_2$ to $SO_3$, as shown in the accompanying FIG. 1, which is a graph showing % conversion of NO or $SO_2$ by oxygen on a 2% by weight platinum on alumina catalyst plotted against temperature. The graph shows also that the conversion of NO to $NO_2$ at low temperature (eg below 250° C.) is very low.

Furthermore, the oxidation of NO to $NO_2$ must be practicable in the environment of an engine exhaust gas. Although many catalysts, eg Cu, Co or Mn, oxidise NO to $NO_2$, many are not sufficiently active in an engine exhaust gas or are readily deactivated in this environment. Even Pt catalyst is inhibited by hydrocarbon and $SO_2$ in this reaction.

The present invention provides a method of combatting air pollution from an internal combustion engine whose exhaust gas contains NO, which method comprises contacting the exhaust gas containing NO with ozone to react the NO with the ozone to produce $NO_2$ and reducing the $NO_2$ to nitrogen.

The invention provides also an internal combustion engine whose exhaust apparatus contains means to contact exhaust gas containing NO with ozone to react the NO with the ozone to produce $NO_2$ and means to reduce the $NO_2$ to nitrogen.

International patent application publication WO 97/22794 refers to an apparatus for reducing pollutants from the combustion of a fuel, the apparatus comprising:

a combustion chamber having a pre-combustion gas stream to the combustion chamber and a post-combustion gas stream of exhaust from the combustion chamber;

a catalytic converter for treating the exhaust to reduce the amount of at least one pollutant from at least one of incomplete combustion of the fuel and oxides of nitrogen; and a device for adding ozone to at least one of the pre-combustion gas stream and the post-combustion gas stream to thereby further reduce the amount of at least one pollutant in the exhaust treated by the catalytic converter.

There is no mention of reacting ozone with NO in the exhaust gas to produce $NO_2$. Indeed, while one can see that enhancing the oxidation of hydrocarbon or carbon monoxide in the exhaust gas might be beneficial, it is not apparent why one would wish to choose conditions so that NO in the exhaust gas is oxidised to $NO_2$ for treatment with a catalytic converter.

It can be seen that the present invention does not rely on the use of a catalyst to oxidise the NO. Instead, the oxidation is achieved by use of a particular oxidant, ozone. We have demonstrated that ozone reacts with the NO to produce $NO_2$ even at low temperature. In addition, we have shown that at low temperature ozone is an excellent selective oxidant, ie it converts all or much NO to $NO_2$ while converting no or little $SO_2$ to $SO_3$.

The internal combustion engine is usually in a vehicle. The engine is especially a lean-burn engine. The engine can be a diesel or petrol engine.

In the present invention, the ozone is usually injected into the exhaust gas containing NO. Accordingly, the engine usually includes injection means to inject the ozone into the exhaust gas containing NO.

The engine usually includes an ozone generator to generate the ozone. The ozone can be generated in ways known in themselves. For instance, the ozone generator can be a corona discharge tube through which passes air between two electrodes which are kept at a large potential difference. Alternatively, the ozone generator can be a high energy lamp to ionise oxygen in air to ozone.

Generally, at least 80% and preferably 100%, of the NO in the exhaust gas contacting the ozone is reacted with the ozone to produce $NO_2$. Sufficient ozone must be employed to carry out the required degree of conversion of the NO. The conversion is $NO+O_3 \rightarrow NO_2+O_2$. Generally, the exhaust gas containing NO is contacted with at least 80%, preferably at least 100%, of the amount of ozone required to react stoichiometrically with the NO to produce $NO_2$. The amount of ozone is usually 0.04–0.16% by volume of the exhaust gas with which it is contacted. The ozone generator is chosen accordingly. As an example, it has been found that for an exhaust gas flow rate of 7,500 litres per hour, containing 400 ppm NO, complete conversion to $NO_2$ can be achieved if 1 litre of air per minute is fed to an ozone generator (Thermo Electron) operating at 60% capacity; if the operation is reduced to below 40% of capacity or the air flow is reduced below 250 ml per minute, the conversion efficiency decreases significantly.

Any ozone in excess over that used in forming the $NO_2$ can be destroyed over a catalyst. However, excess ozone can be employed advantageously to promote the oxidation of hydrocarbon in the exhaust gas, especially at lower temperature.

The $NO_2$ produced in the present invention can be employed in the exhaust gas in ways known in themselves, in particular in the control of particulate emissions from a diesel engine or NOx emission in oxygen-rich conditions.

In a preferred embodiment, the engine is a lean-burn, eg diesel, engine and $NO_2$ produced is adsorbed by an adsorbent which adsorbs the $NO_2$ when the exhaust gas is lean and releases the adsorbed $NO_2$ when the exhaust gas is rich, and the exhaust gas is periodically made rich to release the adsorbed $NO_2$. Accordingly, the engine can be a lean-burn engine and include means to adsorb $NO_2$ produced when the exhaust gas is lean and release the adsorbed $NO_2$ when the exhaust gas is rich and means to make the exhaust gas rich periodically to release the adsorbed $NO_2$. This use of the $NO_2$ produced can be as known in itself, see for instance the European specification 560991A cited above, whose contents are incorporated herein by reference. The adsorbent usually comprises at least one oxide selected from those of alkali metals (eg potassium, sodium, lithium and cesium), alkaline earth metals (eg barium, calcium, strontium and magnesium) and rare earth metals (eg lanthanum, yttrium and cerium). These oxides are capable of reacting with $NO_2$ or $SO_3$ to form the corresponding nitrate or sulphate respectively, but their reaction with NO or $SO_2$ is very low. The advantage of the present invention in its ability to selectively oxidise the NO is clear. This advantage is apparent compared to the known use of Pt with such adsorbent to oxidise NO to $NO_2$. In the present invention, such adsorbent can be used advantageously with a catalyst, such as Pd or Rh, which does not oxidise NO or $SO_2$ but which catalyses other reactions desired in such adsorbent technique. Such other reactions are the reductive release of the $NO_2$ or reactions to oxidise CO and hydrocarbon contained in the exhaust gas. In a preferred embodiment, the adsorbent includes such catalyst, for instance the adsorbent can be $Pd—Ba—Al_2O_3$.

In a preferred embodiment, the $NO_2$ produced is reduced to nitrogen by reaction with gaseous reductant, usually over a catalyst.

In a preferred embodiment, the engine is a lean-burn, eg diesel, engine and $NO_2$ produced is selectively catalytically reduced to nitrogen. Accordingly, the engine can be a lean-burn engine and the means to reduce the $NO_2$ to nitrogen comprise a SCR catalyst. This use of the $NO_2$ produced can be as known in itself, see for instance the Applied Catalysis and Journal of Catalysis papers cited above, whose contents are incorporated herein by reference. A preferred SCR catalyst comprises a zeolite, especially ZSM5, carrying metal, particularly copper. A high conversion efficiency of NOx to nitrogen can be achieved when the exhaust gas contains a specific $NO:NO_2$ ratio. Such ratio can be achieved, for instance over a Cu/ZSM5 catalyst, by means of the present invention, eg by injecting ozone into the exhaust stream to increase the $NO_2$ concentration. In this way, significant improvement in the low temperature removal of NOx can be obtained. Thus; the engine can include means to introduce reductant into the exhaust gas to selectively reduce $NO_2$ to nitrogen. Advantageously, the $NO_2$ is reacted with ammonia to selectively catalytically reduce the $NO_2$ to nitrogen. The engine can include a source of the reductant ammonia. Alternatively, the reductant can be hydrocarbon, eg propene. It has been found that while the presence of ozone improves the SCR of NOx by ammonia at low temperature (for instance below 250° C.), it can mar the conversion at higher temperatures, most probably because the stoichiometry required to achieve 100% conversion for the $NO_2:NH_3$ reaction is higher than that for the $NO:NH_3$ reaction. In such circumstance, it is advantageous to stop the reaction with ozone when the higher temperatures are reached. It has been found, however, that when the reductant is hydrocarbon, the presence of ozone can enhance the conversion of the NOx over the entire temperature window.

In a further preferred embodiment, the engine is a diesel engine, and $NO_2$ produced reacts with particulates from the exhaust gas which have been deposited on a filter, to oxidise and hence remove them. Accordingly, the engine can be a diesel engine and the means to reduce the $NO_2$ to nitrogen comprise a particulate filter on which particulates from the exhaust gas are deposited, which particulates are reacted with $NO_2$ to oxidise and hence remove them. This use of the $NO_2$ produced can be as known in itself, see for instance the European specification 341832A cited above, whose contents are incorporated herein by reference. That European specification describes the use of $NO_2$ as an oxidant to combust diesel particulate deposited on a filter disposed in a diesel exhaust system. The filter can contain a catalyst which facilitates particulate combustion; the filter catalyst can comprise a base metal, for instance a combination of lanthanum, cesium and vanadium pentoxide. Soot or like carbonaceous particulate is combusted at a temperature usually less than 400° C. generally at a temperature of the order of 250–400° C. The most active catalysts for low temperature NO oxidation and therefore for combusting the diesel particulate, however, are also high sulphate producers. In such a system, generating the $NO_2$ instead by means of the present invention is clearly advantageous. It has been found that when ozone is pre-mixed with NO to generate the $NO_2$, the oxidation of diesel soot is initiated at much lower temperature than when oxygen is pre-mixed with NO. Ozone itself can be used to oxidise particulates from diesel exhaust gas which have been deposited on a filter, and hence remove them. However, ozone is highly unstable; it readily decomposes on contact with various surfaces, for instance stainless steel pipe. Reacting the ozone with NO to produce $NO_2$ in the present invention is advantageous for stability. Any ozone in excess over that used in forming the $NO_2$, though, can be used to promote particulate oxidation.

In the present invention, the NO is advantageously reacted with the ozone at a temperature from ambient temperature to 250° C., for instance from ambient temperature to 200° C. The engine can be adapted accordingly.

Advantage is also apparent when the exhaust gas contains $SO_2$, for instance 2–200 parts per minion (ppm) by volume of $SO_2$. In a preferred embodiment, the exhaust gas contacting the ozone contains this amount of $SO_2$.

The NO is advantageously reacted with ozone in the absence of platinum. Hence means in the engine to react the NO with the ozone advantageously does not contain platinum.

The present invention is advantageous even when the exhaust gas contacting the ozone has a relatively large gas hourly space velocity such as is employed in vehicles. The exhaust gas contacting the oxone preferably has a gas hourly space velocity of 30,000 to 50,000.

The present invention is advantageous even when the exhaust gas contacting the ozone contains water vapour. The exhaust gas contacting the oxone preferably contains 4–10% by volume water vapour.

The invention is illustrated by the accompanying drawings, which are graphs and in which:

FIG. 1 shows % conversion of NO and $SO_2$ by oxygen on a Pt catalyst against temperature;

FIG. 2 shows % conversion of NO and $SO_2$ by ozone without a catalyst against temperature;

FIG. 3 shows $CO_2$ evolved from soot by NO—$O_2$ or NO—$O_3$ against temperature;

FIG. 4 shows % soot burnt off at 300° C. by NO—$O_2$ or NO—$O_3$ against time (minutes);

FIG. 5 shows the ppm of NOx left in gas on contact with Ba—$Al_2O_3$ or Pt/Ba—$Al_2O_3$ catalyst at 150° C. against time (minutes);

FIG. 6 shows in arbitrary units the $SO_2$ concentration left in the gas phase on contact with the same catalyst at 650° C. against time (minutes);

FIG. 7 shows the ppm of NOx left in gas on contact with Ba—$Al_2O_3$ catalyst at 150° C. when ozone is injected into the gas against time (minutes);

FIG. 8 shows the % conversion of NOx by SCR by ammonia at a space velocity of 50,000 per hour with and without ozone addition against temperature;

FIG. 9 shows the corresponding conversion with ozone addition which is stopped after the peak at 200° C.;

FIG. 10 shows the % conversion of NOx by SCR by $C_3H_6$ at a space velocity of 50,000 per hour with and without ozone addition against temperature; and FIG. 11 shows the % conversion of $C_3H_6$ in SCR at a space velocity of 50,000 per hour with and without ozone addition against temperature.

FIG. 1 is discussed further above. The other Figures are discussed further below.

The invention is illustrated also by the following Examples, in which the ozone generator was a Thermo Electron ozone generator.

EXAMPLE 1

Selective Oxidation of NO to $NO_2$

The effect of ozone on the oxidation of NO and $SO_2$ was studied by injecting ozone produced by passing air at a flow rate of 40 ml per minute through an ozone generator, into a mixture containing 400 ppm NO, 50 ppm $SO_2$, 4.5% $H_2O$, 4.5% $CO_2$, 0.5% CO and 400 ppm $C_3H_6$, the balance being nitrogen at a flow rate of 5 litres per minute. The NO and $SO_2$ conversion is shown in FIG. 2. The complete oxidation of NO to $NO_2$ is apparent at temperatures of 50° C. to 200° C. Above that temperature, the conversion decreases, mostly due to the decomposition of the ozone, and at high temperature to the thermodynamic instability of $NO_2$. The oxidation of $SO_2$ to $SO_3$ began at 250° C. and was then low, indicating the selectivity of ozone in oxidising NO and not $SO_2$.

EXAMPLE 2

Effect of $O_3$—NO Mixture on Diesel Particulate Oxidation

This Example shows that when ozone is pre-mixed with NO to generate $NO_2$, the oxidation of diesel soot is initiated at much lower temperature than when NO is pre-mixed with $O_2$. The effect was demonstrated in a temperature programmed oxidation experiment in which a gas containing NO (400 ppm), $SO_2$ (50 ppm), $O_2$ (5%) and $H_2O$ (4.5%) with the balance nitrogen at a flow rate of 5 litres per minute was mixed with $O_3$ produced by passing air at a flow rate of 40 ml per minute through an ozone generator and the mixture passed over 1 g of diesel soot particulate, collected on a filter from a diesel engine exhaust, contained in a reactor in a furnace which was ramped at 10° C. per minute. FIG. 3 shows the rate of $CO_2$ production formed by the particulate oxidation as a function of temperature. FIG. 4 shows the fraction of soot burned as a function of time at 300° C. when either NO and $O_2$ or NO and ozone are used as the oxidant. It can be seen that the mixture of NO and $O_3$ is active at lower temperature, and can achieve complete soot oxidation.

EXAMPLE 3

Effect of $O_3$—NO Mixture on NOx Storage

A proposal being considered to decrease NOx emission in high oxygen-containing exhaust gas is to incorporate an adsorbent material into the catalyst system, together with a catalytic element capable of oxidising nitric oxide to $NO_2$. The $NO_2$ is then taken up by the adsorbent to form a nitrate. If the exhaust gas is then switched to reducing condition for a very short period, the surface complex nitrate becomes unstable and releases oxygen and $NO_2$ which can be reduced. The first step is the oxidation of NO to $NO_2$ and platinum is an important component of that system. However, Pt also catalyses the oxidation of $SO_2$ to $SO_3$ which can interact with the adsorbent.

FIG. 5 shows the NOx adsorption on Ba—$Al_2O_3$ and Pt/Ba—$Al_2O_3$ from a gas mixture containing 250 ppm NO, 8% $O_2$ with the balance nitrogen by flowing 2 litres per minute of gas over 0.4 g of catalyst at 150° C. It is clear that in the presence of Pt, significant amounts of the NOx are being stored on the catalyst.

FIG. 6 shows the $SO_2$ breakthrough from a mixture of 50 ppm and 8% $O_2$ with the balance nitrogen on the same catalysts at similar mass hourly space velocity at 650° C. Similar to the NOx adsorption, in the absence of Pt the $SO_2$ is not converted or adsorbed over the catalyst. The presence of Pt enhances these processes. In these adsorbent systems, the ability to selectively generate $NO_2$ instead of $SO_3$ would be important to decrease catalyst deactivation. Example 1 above demonstrates that ozone can selectively oxidise NO to $NO_2$ and is not reactive to $SO_2$.

FIG. 7 demonstrates that the $NO_2$ generated by the interaction of NO with ozone can readily be adsorbed on the storage material at low temperature (150° C.). The Figure shows the effect of injecting ozone produced from an ozoniser to a mixture of 250 ppm NO, 8% $O_2$ with the balance nitrogen at 150° C. on the storage activity of Ba—$Al_2O_3$. The NOx absorption is significantly enhanced with the injection of ozone.

EXAMPLE 4

Promotion of the Selective Catalytic Reduction of NOx by $NH_3$

The effect of injecting ozone to a reactive mixture (200 ppm NO, 200 ppm $NH_3$, 12% $O_2$, 4.5% $CO_2$, 200 ppm CO, 4.5% $H_2O$, 20 ppm $SO_2$ with the balance nitrogen on the NOx reduction activity of Cu/ZSM5 is shown in FIG. 8. The addition of ozone significantly improves the reduction of the NOx by $NH_3$ at temperatures below 200° C., through the formation of the more active $NO_2$ species. However, in the presence of ozone, the NOx conversion decreases at higher temperature, because most probably the stoichiometry required to achieve 100% conversion for the $NO_2$:$NH_3$ reaction is higher than that for NO:$NH_3$ reaction. However, if the ozoniser is switched off after the first peak conversion at 200° C., the high temperature conversion profile improves—FIG. 9. This ability to generate $NO_2$ when required is highly desirable for SCR utility.

EXAMPLE 5

Promotion of the Selective Catalytic Reduction of NOx by $C_3H_6$

The selective reduction of NOx by hydrocarbon in an oxidising environment on Cu/ZSM5 catalyst is believed to occur by a dual function mechanism, with the acid sites promoting coke formation and the Cu sites catalysing $NO_2$ formation. The reaction of the $NO_2$ with the carbonaceous species is believed to lead to the reduction of NOx to nitrogen. It has been shown that if $NO_2$ is present, the reactivity of the Cu/ZSM5 catalyst for the selective reduction of NOx be $C_3H_6$ can be improved at low temperature. The effect of injecting ozone to a reactive mixture (200 ppm NO, 400 ppm $C_3H_6$, 12% $O_2$, 4.5% $CO_2$, 200 ppm CO, 4.5% $H_2O$, 20 ppm $SO_2$ with the balance nitrogen) on the reduction activity over Cu/ZSM5 is shown in FIG. 10. FIG. 11 shows that the addition of ozone catalyses the hydrocarbon oxidation at a lower temperature.

What is claimed is:

1. A method of combatting air pollution from an internal combustion engine whose exhaust gas comprises NO and $SO_2$, comprising the steps of:

oxidizing NO to $NO_2$ selectively over oxidizing $SO_2$ to $SO_3$ by contacting the exhaust gas with ozone in the absence of material catalytic for oxidizing $SO_2$ to $SO_3$;

selectively catalytically reducing $NO_2$ to nitrogen by contacting the $NO_2$ produced from the oxidizing step with a reductant in the presence of a catalyst; and discharging unreacted $SO_2$ to atmosphere.

2. A method according to claim 1, wherein the reductant comprises ammonia.

3. A method according to claim 2, wherein the catalyst comprises a zeolite carrying a metal.

4. A method according to claim 3, wherein the zeolite comprises ZSM5.

5. A method according to claim 3, wherein the metal comprises copper.

6. A method according to claim 2, wherein the reducing step is carried out at temperatures below 250° C.

7. A method according to claim 1, wherein the oxidizing step is carried out at temperatures below 250° C.

8. A method according to claim 1, wherein the oxidizing step is carried out at temperatures below 200° C.

9. A method according to claim 7, wherein the oxidizing step is carried out at temperatures of from 50° C. to 250° C.

10. A method according to claim 8, wherein the oxidizing step is carried out at temperatures of from 50° C. to 200° C.

11. A method according to claim 1, wherein the reductant comprises a hydrocarbon.

12. A method according to claim 11, wherein the catalyst comprises a zeolite carrying a metal.

13. A method according to claim 12, wherein the zeolite comprises ZSM5.

14. A method according to claim 12, wherein the metal comprises copper.

15. A method according to claim 1, wherein the oxidizing step is carried out in the absence of platinum.

16. A method according to claim 1, wherein the amount by volume of $SO_2$ in the exhaust gas is 2–200 parts per million.

17. A method according to claim 1, wherein the ozone is injected into the exhaust gas.

18. A method according to claim 1, wherein at least 80% of the NO in the exhaust gas contacting the ozone is reacted with the ozone to produce $NO_2$.

19. A method according to claim 1, wherein the oxidizing step comprises conveying the exhaust gas at a gas hourly space velocity in the range of 30,000 to 50,000.

20. A method according to claim 1, wherein the exhaust gas contacted with ozone contains 4–10% water vapor by volume.

21. A method according to claim 1, wherein the exhaust gas is from a diesel engine.

* * * * *